US009824826B2

(12) United States Patent
Petrzilek et al.

(10) Patent No.: US 9,824,826 B2
(45) Date of Patent: Nov. 21, 2017

(54) SOLID ELECTROLYTIC CAPACITOR CONTAINING CONDUCTIVE POLYMER PARTICLES

(71) Applicant: AVX Corporation, Fountain Inn, SC (US)

(72) Inventors: Jan Petrzilek, Usti nad Orlici (CZ); Martin Biler, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 152 days.

(21) Appl. No.: 14/266,937

(22) Filed: May 1, 2014

(65) Prior Publication Data
US 2014/0334069 A1 Nov. 13, 2014

Related U.S. Application Data

(60) Provisional application No. 61/822,525, filed on May 13, 2013.

(51) Int. Cl.
*H01G 9/042* (2006.01)
*H01G 9/028* (2006.01)
*H01G 9/15* (2006.01)
*H01G 9/00* (2006.01)
*H01G 9/052* (2006.01)
*H01G 9/032* (2006.01)

(52) U.S. Cl.
CPC ............ *H01G 9/15* (2013.01); *H01G 9/0032* (2013.01); *H01G 9/0036* (2013.01); *H01G 9/028* (2013.01); *H01G 9/032* (2013.01); *H01G 9/0525* (2013.01)

(58) Field of Classification Search
USPC .......................... 361/528, 523, 525
See application file for complete search history.

(56) References Cited

U.S. PATENT DOCUMENTS

| 3,345,545 | A | 10/1967 | Bourgault et al. |
| 3,440,495 | A | 4/1969 | Howard et al. |
| 3,611,055 | A | 10/1971 | Zeppieri et al. |
| 3,922,773 | A | 12/1975 | Marien et al. |
| 4,017,302 | A | 4/1977 | Bates et al. |

(Continued)

FOREIGN PATENT DOCUMENTS

| GB | 1069685 | 8/1965 |
| JP | S 58199519 | 11/1983 |

(Continued)

OTHER PUBLICATIONS

Search Report for GB1407647.5 dated Sep. 19, 2014, 4 pages.

(Continued)

*Primary Examiner* — Eric Thomas
(74) *Attorney, Agent, or Firm* — Dority & Manning, P.A.

(57) ABSTRACT

A solid electrolytic capacitor that contains an anode body, dielectric overlying the anode body, adhesion coating overlying the dielectric, and solid electrolyte overlying the adhesion coating. The solid electrolyte contains an inner conductive polymer layer and outer conductive polymer layer, at least one of which is formed from a plurality of pre-polymerized conductive polymer particles. Furthermore, the adhesion coating contains a discontinuous precoat layer containing a plurality of discrete nanoprojections of a manganese oxide (e.g., manganese dioxide).

20 Claims, 1 Drawing Sheet

(56) References Cited

U.S. PATENT DOCUMENTS

| | | |
|---|---|---|
| 4,085,435 A | 4/1978 | Galvagni |
| 4,441,927 A | 4/1984 | Getz et al. |
| 4,479,168 A | 10/1984 | Green, Jr. |
| 4,483,819 A | 11/1984 | Albrecht et al. |
| 4,508,563 A | 4/1985 | Bernard et al. |
| 4,555,268 A | 11/1985 | Getz |
| 4,755,908 A | 7/1988 | Gardner |
| 4,910,645 A | 3/1990 | Jonas et al. |
| 4,943,892 A | 7/1990 | Tsuchiya et al. |
| 4,945,452 A | 7/1990 | Sturmer et al. |
| 4,959,430 A | 9/1990 | Jonas et al. |
| 4,960,471 A | 10/1990 | Fife et al. |
| 5,082,491 A | 1/1992 | Rerat |
| 5,111,327 A | 5/1992 | Blohm et al. |
| 5,198,968 A | 3/1993 | Galvagni |
| 5,232,169 A | 8/1993 | Kaneko et al. |
| 5,300,575 A | 4/1994 | Jonas et al. |
| 5,314,606 A | 5/1994 | Irie et al. |
| 5,357,399 A | 10/1994 | Salisbury |
| 5,394,295 A | 2/1995 | Galvagni et al. |
| 5,457,862 A | 10/1995 | Sakata et al. |
| 5,473,503 A | 12/1995 | Sakata et al. |
| 5,495,386 A | 2/1996 | Kulkarni |
| 5,522,558 A | 6/1996 | Kaneko |
| 5,586,000 A | 12/1996 | Sakata et al. |
| 5,608,261 A | 3/1997 | Bhattacharyya et al. |
| 5,638,253 A | 6/1997 | Hasegawa |
| 5,694,287 A | 12/1997 | Nishiyama et al. |
| 5,729,428 A | 3/1998 | Sakata et al. |
| 5,812,367 A | 9/1998 | Kudoh et al. |
| 5,949,639 A | 9/1999 | Maeda et al. |
| 5,951,840 A | 9/1999 | Fukaumi et al. |
| 5,954,856 A | 9/1999 | Pathare et al. |
| 6,052,273 A | 4/2000 | Inoue et al. |
| 6,126,097 A | 10/2000 | Chen et al. |
| 6,145,765 A | 11/2000 | Capelle, Jr. et al. |
| 6,191,936 B1 | 2/2001 | Webber et al. |
| 6,197,252 B1 | 3/2001 | Bishop et al. |
| 6,238,456 B1 | 5/2001 | Wolf et al. |
| 6,322,912 B1 | 11/2001 | Fife |
| 6,324,050 B1 | 11/2001 | Kobatake et al. |
| 6,369,239 B2 | 4/2002 | Rauchschwalbe et al. |
| 6,391,275 B1 | 5/2002 | Fife |
| 6,409,777 B2 | 6/2002 | Kobatake et al. |
| 6,416,730 B1 | 7/2002 | Fife |
| 6,445,566 B2 | 9/2002 | Watanabe et al. |
| 6,447,570 B1 | 9/2002 | Pozdeev-Freeman |
| 6,527,937 B2 | 3/2003 | Fife |
| 6,528,662 B2 | 3/2003 | Jonas |
| 6,576,038 B1 | 6/2003 | Rao |
| 6,576,099 B2 | 6/2003 | Kimmel et al. |
| 6,592,740 B2 | 7/2003 | Fife |
| 6,594,141 B2 | 7/2003 | Takada |
| 6,635,729 B1 | 10/2003 | Groenendaal et al. |
| 6,639,787 B2 | 10/2003 | Kimmel et al. |
| 6,674,635 B1 | 1/2004 | Fife et al. |
| 6,756,473 B2 | 6/2004 | Reuter et al. |
| 6,804,109 B1 | 10/2004 | Hahn et al. |
| 6,806,210 B2 | 10/2004 | Shiho et al. |
| 6,864,147 B1 | 3/2005 | Fife et al. |
| 6,891,016 B2 | 5/2005 | Reuter et al. |
| 6,987,663 B2 | 1/2006 | Merker et al. |
| 7,102,016 B2 | 9/2006 | Reuter |
| 7,116,548 B2 | 10/2006 | Satterfield, Jr. et al. |
| 7,118,690 B2 | 10/2006 | Wessling et al. |
| 7,154,740 B2 | 12/2006 | Merker et al. |
| 7,220,397 B2 | 5/2007 | Kimmel et al. |
| 7,221,554 B2 | 5/2007 | Brenneman et al. |
| 7,262,511 B2 | 8/2007 | Osako et al. |
| 7,279,015 B2 | 10/2007 | Merker |
| 7,304,832 B2 | 12/2007 | Ushio et al. |
| 7,312,979 B2 | 12/2007 | Ishizuka et al. |
| 7,341,705 B2 | 3/2008 | Schnitter |
| 7,341,801 B2 | 3/2008 | Reuter et al. |
| 7,358,326 B2 | 4/2008 | Heuer et al. |
| 7,377,947 B2 | 5/2008 | Merker et al. |
| 7,381,396 B2 | 6/2008 | Thomas et al. |
| 7,411,779 B2 | 8/2008 | Merker et al. |
| 7,419,926 B2 | 9/2008 | Schnitter et al. |
| 7,449,588 B2 | 11/2008 | Jonas et al. |
| 7,468,882 B2 | 12/2008 | Marek et al. |
| 7,515,396 B2 | 4/2009 | Biler |
| 7,554,793 B2 | 6/2009 | Chacko |
| 7,563,290 B2 | 7/2009 | Qiu et al. |
| 7,582,958 B2 | 9/2009 | Brailey |
| 7,585,983 B2 | 9/2009 | Reuter et al. |
| 7,602,600 B1 | 10/2009 | Itoh |
| 7,679,885 B2 | 3/2010 | Mizusaki et al. |
| 7,688,571 B2 | 3/2010 | Ishizuka et al. |
| 7,697,265 B2 | 4/2010 | Umemoto et al. |
| 7,729,103 B2 | 6/2010 | Kato et al. |
| 7,750,099 B2 | 7/2010 | Chikusa et al. |
| 7,785,493 B2 | 8/2010 | Jonas et al. |
| 7,883,796 B2 | 2/2011 | Kida et al. |
| 7,916,456 B2 | 3/2011 | Mori et al. |
| 7,948,069 B2 | 5/2011 | Zhuang |
| 7,972,534 B2 | 7/2011 | Merker et al. |
| 7,973,180 B2 | 7/2011 | Morita et al. |
| 7,988,743 B2 | 8/2011 | Shimamoto et al. |
| 7,994,345 B2 | 8/2011 | Brassat et al. |
| 8,058,135 B2 | 11/2011 | Merker et al. |
| 8,094,434 B2 | 1/2012 | Rawal et al. |
| 8,310,815 B2 | 11/2012 | Freeman et al. |
| 8,313,538 B2 | 11/2012 | Merker et al. |
| 8,349,683 B2 | 1/2013 | Naito |
| 8,512,422 B2 | 8/2013 | Pinwill et al. |
| 8,619,410 B2 | 12/2013 | Pinwill et al. |
| 8,747,489 B2 | 6/2014 | Pinwill et al. |
| 8,808,403 B2 | 8/2014 | Qiu et al. |
| 8,824,122 B2 | 9/2014 | Vilc et al. |
| 2004/0231119 A1 | 11/2004 | Brenneman et al. |
| 2005/0065352 A1 | 3/2005 | Brassat et al. |
| 2006/0260713 A1 | 11/2006 | Pyszczek et al. |
| 2007/0002526 A1* | 1/2007 | Naito .................. H01G 9/0032 361/523 |
| 2009/0310285 A1 | 12/2009 | Reuter et al. |
| 2010/0024182 A1* | 2/2010 | Shimamoto ............ H01G 9/028 29/25.42 |
| 2010/0148124 A1 | 6/2010 | Reuter et al. |
| 2011/0096466 A1* | 4/2011 | Horacek ............... H01G 9/0036 361/525 |
| 2013/0059064 A1 | 3/2013 | Majima et al. |
| 2013/0279079 A1* | 10/2013 | Merker ................ H01G 9/0029 361/528 |

FOREIGN PATENT DOCUMENTS

| | | |
|---|---|---|
| JP | 3127813 | 5/1991 |
| JP | 11112157 | 4/1999 |
| JP | 2005217129 | 8/2005 |
| JP | 2006278875 | 10/2006 |
| JP | 2012189520 | 8/2012 |
| WO | WO 2008003938 | 1/2008 |
| WO | WO 2009030615 | 3/2009 |
| WO | WO 2009043648 | 4/2009 |
| WO | WO 2009047059 | 4/2009 |
| WO | WO 2009135752 | 11/2009 |
| WO | WO 2009141209 | 11/2009 |
| WO | WO 2010003874 | 1/2010 |
| WO | WO 2010015468 | 2/2010 |
| WO | WO 2010089111 | 8/2010 |
| WO | WO 2010102751 | 9/2010 |
| WO | WO 2012162544 A2 | 11/2012 |
| WO | WO 2012162544 A3 | 11/2012 |

OTHER PUBLICATIONS

Abstract of Japanese Patent No. JP1140621 dated Jun. 1, 1989.
Abstract of Japanese, Patent No. JPH0396210, Apr. 22, 1991, w pages.
Abstract of Japanese Patent No. JP3109712 dated May 9, 1991.
Abstract of Japanese Patent No. JP3109713 dated May 9, 1991.
Abstract of Japanese Patent No. JP3109714 dated May 9, 1991.

(56) References Cited

OTHER PUBLICATIONS

Abstract of Japanese Patent No. JP2924310 dated Jul. 26, 1999, 2 pages.
Machine Translation of JP2005217129, 11 pages.
Machine Translation of JP2006278875, 8 pages.
Machine Translation of JP 2005039168; Oct. 2. 2006; 17 pages.
Abstract of WO Patent No. 2014034201, Mar. 6, 2014, 2 pages.
Article—Freeman et al, "Stable, Reliable, and Efficient Tantalum Capacitors," *CARTS USA 2008*, 28th Symposium for Passive Electronics, Mar. 2008, Newport Beach, California, 6 pages.
Article—Freeman et al., "Electrical Characterization of Polymer Tantalum Capacitors with Poly(3,4-ethylenedioxythiophene) Cathode," *CARTS Europe 2008*, Oct. 20-23, 2008, in Helsinki, Finland, 9 pages.
Articie—Freeman et al., "Reliability and Critical Applications of Tantalum Capactitors,"*CARTS Europe 2007*, Oct.-Nov. 2007, Barcelona, Spain, pp. 193-204.
Article—Pozdeev-Freeman, et al., "Critical oxygen content in porous anodes of solid tantalum capacitors,"*Journal of Materials Science in Electronics*, vol. 9, 1998, pp. 309-311.
Article—Simkins et al., "Tantalum Powders for High Voltage Applications II," *CARTS 2004*, 24th Annual Capacitor and Resistor Technology Symposium, Mar. 29, Apr. 1, 2004, pp. 47-54.
Paper—Merker et al., "Conducting Polymer Dispersions for High-Capacitance Tantalum Capacitors,": CARTS Europe 2006, Sep. 2006, Bad Homburg, Germany, 6 pages.
Paper—Merker et al., "New Conducting Polymer Dispersions for Solid Electrolytic Capacitors," CARTS Europe 2005. Oct. 17-20, 2005, Prague, CZ Republic, 6 pages.
Paper—Merker et al., "Tuning Conducting Polymer Dispersions for High-CV Tantalum Capacitors," CARTS Europe Oct. 29-Nov. 1, 2007, Barcelona, Spain, 6 pages.
Paper—Simpson et al.; "Advances and Applications of Inherently Conductive Polymer Technologies Based on Poly(3,4,-Ethylenedioxythiophene)," 2005 AIMCAL Fall Technical Conference and 19th International Vacuum Web Coating Conference, Oct. 16-20, 2005, Session 5: Advances in Technology, Myrtle Beach, SC, 10 pages.
Paper—Young et al., "Performance and Reliability Study of High Voltage Tantalum Polymer Capacitors," 2010 Electronic Components Association, Inc. Arlington, VA, CARTS 2010 Conference Proceedings, CARTS 2010 Conference, New Orleans, LA, Apr. 2010, 13 pages.
Presentation—Freeman et al., "Hermetically Sealed Polymer Tantalum Capacitors," CMSE Europe 2010.
Related U.S. Patent Application Form.
Aoki et al., U.S. Appl. No. 14/266,912, filed May 1, 2014, Solid Electrolytic Capacitor Containing a Pre-Coat Layer.
Aoki et al., U.S. Appl. No. 14/266,923, filed May 1, 2014, Solid Electrolytic Capacitor Containing a Multi-Layered Adhesion Coating.
Abstract of Japanese Patent No. JPH01183806 dated Jul. 21, 1989.
Examination Report for GB1407649.1 dated Aug. 25, 2017, 4 pages.
Examination Report for GB1407648.3 dated Sep. 6, 2017, 5 pages.

\* cited by examiner

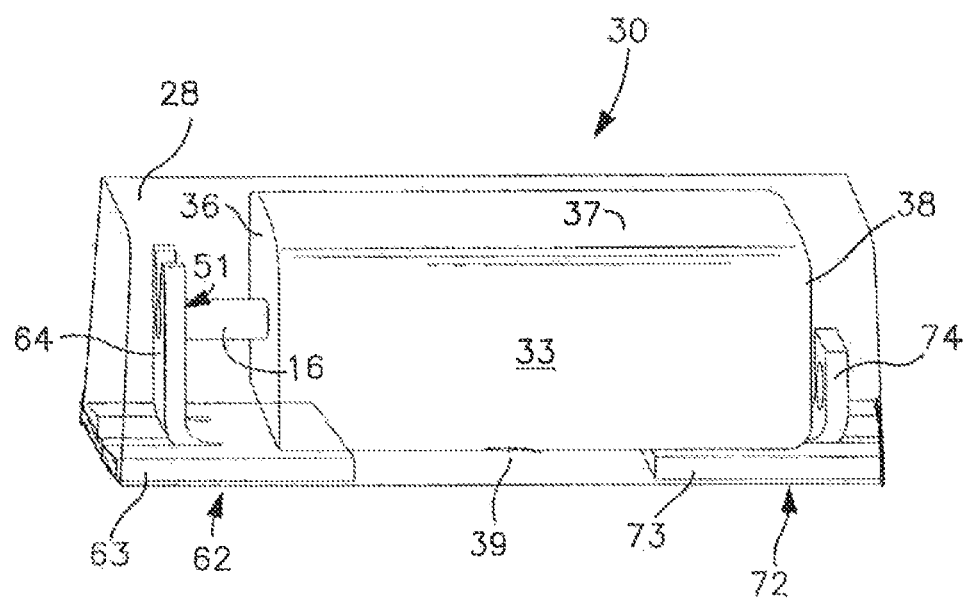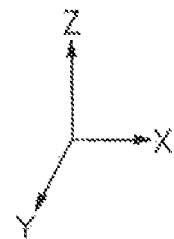

US 9,824,826 B2

SOLID ELECTROLYTIC CAPACITOR CONTAINING CONDUCTIVE POLYMER PARTICLES

RELATED APPLICATIONS

The present application claims priority to U.S. Provisional Application Ser. No. 61/822,525 (filed on May 13, 2013) and which is incorporated herein in its entirety by reference thereto.

BACKGROUND OF THE INVENTION

Solid electrolytic capacitors (e.g., tantalum capacitors) are typically made by pressing a metal powder (e.g., tantalum) around a metal lead wire, sintering the pressed part, anodizing the sintered anode, and thereafter applying a solid electrolyte. Intrinsically conductive polymers are often employed as the solid electrolyte due to their advantageous low equivalent series resistance ("ESR") and "non-burning/non-ignition" failure mode. Such electrolytes can be formed through in situ chemical polymerization of the monomer in the presence of a catalyst and dopant. One of the problems with conventional capacitors that employ in situ polymerized polymers is that they tend to fail at high voltages, such as experienced during a fast switch on or operational current spike. In an attempt to overcome some of these issues, premade conductive polymer slurries have also been employed in certain applications as an alternative solid electrolyte material. While some benefits have been achieved with these capacitors in high voltage environments, problems nevertheless remain. For instance, one problem with polymer slurry-based capacitors is that it is often difficult for the interior polymer layers, whether in situ polymerized or made from a polymer slurry, to penetrate and uniformly coat the pores of the anode. Not only does this reduce the points of contact between the electrolyte and dielectric, but it can also cause delamination of the polymer from the dielectric during mounting or use. As a result of these problems, it is often difficult to achieve ultralow ESR and/or leakage current values, particularly at relatively high voltages.

As such, a need currently exists for an improved electrolytic capacitor containing a conductive polymer solid electrolyte.

SUMMARY OF THE INVENTION

In accordance with one embodiment of the present invention, a solid electrolytic capacitor is disclosed that comprises an anode body, dielectric that overlies the anode body, an adhesion coating that overlies the dielectric, and solid electrolyte that overlies the adhesive coating. The adhesion coating contains a discontinuous precoat layer that contains a plurality of discrete nanoprojections of a manganese oxide. The solid electrolyte includes an inner conductive polymer layer and an outer conductive polymer layer, at least one of which is formed from a dispersion of pre-polymerized particles.

In accordance with another embodiment of the present invention, a method for forming a solid electrolytic capacitor is disclosed. The method comprises contacting an anode that contains an anode body and a dielectric with a solution that contains a manganese oxide precursor, pyrolytically converting the precursor to form a discontinuous pre-coat layer containing a plurality of discrete nanoprojections of a manganese oxide, chemically polymerizing a monomer to form an inner conductive polymer layer that is in contact with the dielectric and nanoprojections, and applying a dispersion of pre-polymerized conductive polymer particles to form an outer layer that overlies the inner layer.

Other features and aspects of the present invention are set forth in greater detail below.

BRIEF DESCRIPTION OF THE DRAWING

A full and enabling disclosure of the present invention, including the best mode thereof, directed to one of ordinary skill in the art, is set forth more particularly in the remainder of the specification, which makes reference to the appended FIGURE in which:

FIG. 1 is a schematic illustration of one embodiment of a capacitor that may be formed in accordance with the present invention.

Repeat use of references characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a solid electrolytic capacitor that contains an anode body, dielectric located over and/or within the anode body, an adhesion coating overlying the dielectric, and a solid electrolyte overlying the adhesion coating. The solid electrolyte contains an inner conductive polymer layer and outer conductive polymer layer, at least one of which is formed from a plurality of pre-polymerized conductive polymer particles. In this manner, the presence of high energy radicals (e.g., $Fe^{2+}$ or $Fe^{3+}$ ions), which might otherwise lead to lead to dielectric degradation at high voltages, may be minimized. Furthermore, the adhesion coating contains a discontinuous precoat layer containing a plurality of discrete nanoprojections of a manganese oxide (e.g., manganese dioxide). Without intending to be limited by theory, it is believed that the small size of such discrete nanoprojections allows them to readily penetrate into the small pores of the anode body so that when deposited on the dielectric, they can become embedded into the inner conductive polymer layer to enhance adhesion between the dielectric and the solid electrolyte, which can ultimately improve capacitance while also minimizing leakage current and/or ESR.

Various embodiments of the invention will now be described in more detail.

I. Anode

The anode may be formed from a powder having a specific charge of from about 2,000 microFarads*Volts per gram ("µF*V/g") to about 350,000 µF*V/g. As is known in the art, the specific charge may be determined by multiplying capacitance by the anodizing voltage employed, and then dividing this product by the weight of the anodized electrode body. In certain embodiments, the powder may have a low specific charge, such as from about 2,000 µF*V/g to about 70,000 µF*V/g, in some embodiments from about 3,000 µF*V/g to about 40,000 µF*V/g or more, and in some embodiments, from about 4,000 to about 20,000 µf*V/g. Of course, the powder may also have a high specific charge, such as from about 70,000 to about 350,000 µF*V/g, in some embodiments, in some embodiments from about 100,000 to about 300,000 µF*V/g, and in some embodiments, from about 120,000 to about 250,000 µF*V/g.

The powder may contain individual particles and/or agglomerates of such particles. Compounds for forming the powder include a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of $1:1.0\pm1.0$, in some embodiments $1:1.0\pm0.3$, in some embodiments $1:1.0\pm0.1$, and in some embodiments, $1:1.0\pm0.05$. For example, the niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, al., as well as U.S. Patent Application Publication Nos. 2005/0019581 to Schnitter; 2005/0103638 to Schnitter, et al.; 2005/0013765 to Thomas, et al.

The apparent density (or Scott density) of the powder may vary as desired, but typically ranges from about 1 to about 8 grams per cubic centimeter (g/cm³), in some embodiments from about 2 to about 7 g/cm³, and in some embodiments, from about 3 to about 6 g/cm³. To achieve the desired level of packing and apparent density, the size and shape of the particles (or agglomerates) may be carefully controlled. For example, the shape of the particles may be generally spherical, nodular, etc. The particles may have an average size of from about 0.1 to about 20 micrometers, in some embodiments from about 0.5 to about 15 micrometers, and in some embodiments, from about 1 to about 10 micrometers.

The powder may be formed using techniques known to those skilled in the art. A precursor tantalum powder, for instance, may be formed by reducing a tantalum salt (e.g., potassium fluotantalate ($K_2TaF_7$), sodium fluotantalate ($Na_2TaF_7$), tantalum pentachloride ($TaCl_5$), etc.) with a reducing agent (e.g., hydrogen, sodium, potassium, magnesium, calcium, etc.). Such powders may be agglomerated in a variety of ways, such as through one or multiple heat treatment steps at a temperature of from about 700° C. to about 1400° C., in some embodiments from about 750° C. to about 1200° C., and in some embodiments, from about 800° C. to about 1100° C. Heat treatment may occur in an inert or reducing atmosphere. For example, heat treatment may occur in an atmosphere containing hydrogen or a hydrogen-releasing compound (e.g., ammonium chloride, calcium hydride, magnesium hydride, etc.) to partially sinter the powder and decrease the content of impurities (e.g., fluorine). If desired, agglomeration may also be performed in the presence of a getter material, such as magnesium. After thermal treatment, the highly reactive coarse agglomerates may be passivated by gradual admission of air. Other suitable agglomeration techniques are also described in U.S. Pat. No. 6,576,038 to Rao; U.S. Pat. No. 6,238,456 to Wolf, et al.; U.S. Pat. No. 5,954,856 to Pathare, et al.; U.S. Pat. No. 5,082,491 to Rerat; U.S. Pat. No. 4,555,268 to Getz; U.S. Pat. No. 4,483,819 to Albrecht, et al.; U.S. Pat. No. 4,441,927 to Getz, et al.; and U.S. Pat. No. 4,017,302 to Bates, et al.

The desired size and/or shape of the particles may be achieved by controlling various processing parameters as is known in the art, such as the parameters relating to powder formation (e.g., reduction process) and/or agglomeration (e.g., temperature, atmosphere, etc.). Milling techniques may also be employed to grind a precursor powder to the desired size. Any of a variety of milling techniques may be utilized to achieve the desired particle characteristics. For example, the powder may initially be dispersed in a fluid medium (e.g., ethanol, methanol, fluorinated fluid, etc.) to form a slurry. The slurry may then be combined with a grinding media (e.g., metal balls, such as tantalum) in a mill. The number of grinding media may generally vary depending on the size of the mill, such as from about 100 to about 2000, and in some embodiments from about 600 to about 1000. The starting powder, the fluid medium, and grinding media may be combined in any proportion. For example, the ratio of the starting powder to the grinding media may be from about 1:5 to about 1:50. Likewise, the ratio of the volume of the fluid medium to the combined volume of the starting powder may be from about 0.5:1 to about 3:1, in some embodiments from about 0.5:1 to about 2:1, and in some embodiments, from about 0.5:1 to about 1:1. Some examples of mills that may be used in the present invention are described in U.S. Pat. Nos. 5,522,558; 5,232,169; 6,126,097; and 6,145,765. Milling may occur for any predetermined amount of time needed to achieve the target size. For example, the milling time may range from about 30 minutes to about 40 hours, in some embodiments, from about 1 hour to about 20 hours, and in some embodiments, from about 5 hours to about 15 hours. Milling may be conducted at any desired temperature, including at room temperature or an elevated temperature. After milling, the fluid medium may be separated or removed from the powder, such as by air-drying, heating, filtering, evaporating, etc.

Various other conventional treatments may also be employed in the present invention to improve the properties of the powder. For example, in certain embodiments, the particles may be treated with sinter retardants in the presence of a dopant, such as aqueous acids (e.g., phosphoric acid). The amount of the dopant added depends in part on the surface area of the powder, but is typically present in an amount of no more than about 200 parts per million ("ppm"). The dopant may be added prior to, during, and/or subsequent to any heat treatment step(s).

The particles may also be subjected to one or more deoxidation treatments to improve ductility and reduce leakage current in the anodes. For example, the particles may be exposed to a getter material (e.g., magnesium), such as described in U.S. Pat. No. 4,960,471. The getter material may be present in an amount of from about 2% to about 6% by weight. The temperature at which deoxidation occurs may vary, but typically ranges from about 700° C. to about 1600° C., in some embodiments from about 750° C. to about 1200° C., and in some embodiments, from about 800° C. to about 1000° C. The total time of deoxidation treatment(s) may range from about 20 minutes to about 3 hours. Deoxidation also preferably occurs in an inert atmosphere (e.g., argon). Upon completion of the deoxidation treatment(s), the magnesium or other getter material typically vaporizes and forms a precipitate on the cold wall of the furnace. To ensure removal of the getter material, however, the fine agglomerates and/or coarse agglomerates may be subjected to one or more acid leaching steps, such as with nitric acid, hydrofluoric acid, etc.

To facilitate the construction of the anode, certain components may also be included in the powder. For example, the powder may be optionally mixed with a binder and/or lubricant to ensure that the particles adequately adhere to each other when pressed to form the anode body. Suitable binders may include, for instance, poly(vinyl butyral); poly (vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly (lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body.

After compaction, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum or an inert atmosphere. Upon sintering, the pellet shrinks due to the growth of bonds between the particles. The pressed density of the pellet after sintering may vary, but is typically from about 2.0 to about 7.0 grams per cubic centimeter, in some embodiments from about 2.5 to about 6.5, and in some embodiments, from about 3.0 to about 6.0 grams per cubic centimeter. The pressed density is determined by dividing the amount of material by the volume of the pressed pellet.

The anode body may also have a relatively low carbon and oxygen content. For example, the anode body may have no more than about 50 ppm carbon, and in some embodiments, no more than about 10 ppm carbon. Likewise, the anode body may have no more than about 0.15 ppm/μC/g oxygen, and in some embodiments, no more than about 0.10 ppm/μC/g oxygen. Oxygen content may be measured by LECO Oxygen Analyzer and includes oxygen in natural oxide on the tantalum surface and bulk oxygen in the tantalum particles. Bulk oxygen content is controlled by period of crystalline lattice of tantalum, which is increasing linearly with increasing oxygen content in tantalum until the solubility limit is achieved. This method was described in "Critical Oxygen Content In Porous Anodes Of Solid Tantalum Capacitors", Pozdeev-Freeman et al., Journal of Materials Science: Materials In Electronics 9, (1998) 309-311 wherein X-ray diffraction analysis (XRDA) was employed to measure period of crystalline lattice of tantalum. Oxygen in sintered tantalum anodes may be limited to thin natural surface oxide, while the bulk of tantalum is practically free of oxygen.

Although not required, the thickness of the anode may be selected to improve the electrical performance of the capacitor. For example, the thickness of the anode may be about 4 millimeters or less, in some embodiments, from about 0.05 to about 2 millimeters, and in some embodiments, from about 0.1 to about 1 millimeter. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al.

II. Dielectric

The anode is also coated with a dielectric. The dielectric may be formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 400 V, and the temperature typically ranges from about 10° C. to about 100° C.

III. Adhesion Coating

As indicated above, the adhesion coating of the capacitor contains a discontinuous precoat layer, which includes a plurality of discrete nanoprojections of a manganese oxide (e.g., manganese dioxide) that can penetrate into the small pores of the anode body and ultimately become embedded into the inner conductive polymer layer. Because the precoat layer is formed as discrete nanoprojections rather than as a continuous layer, the conductive polymer may be able to directly contact a substantial portion of the dielectric, either directly or through contact with another layer, such as described below. The relatively large degree of contact between the inner conductive polymer and dielectric can even further reduce ESR. To accomplish the desired result without adversely impacting the overall performance of the capacitor, the average size (e.g., diameter) of the nanoprojections is typically large enough so that an improvement in adhesion is achieved, but yet not so large that they are incapable of penetrating into the pores of the anode. In this regard, the nanoprojections typically have an average size of from about 5 nanometers to about 500 nanometers, in some embodiments from about 6 nanometers to about 250 nanometers, in some embodiments, from about 8 nanometers to about 150 nanometers, and in some embodiments, from about 10 nanometers to about 110 nanometers. The term "average diameter" may, for example, refer to the average value for the major axis of the nanoprojections when viewed from above (the maximum diameter). Such diameters may be obtained, for example, using known techniques, such as photon correlation spectroscopy, dynamic light scattering, quasi-elastic light scattering, etc. Various particle size analyzers may be employed to measure the diameter in this manner. One particular example is a Corouan VASCO 3 Particle Size Analyzer. Although not necessarily required, the nanoprojections may also have a narrow size distribution, which may further improve the properties of the capacitor. For instance, about 50% or more, in some embodiments about 70% or more, and in some embodiments, about 90% or more of the nanoprojections may have an average size within the ranges noted above. The number of nanoprojections having a certain size may be determined using the techniques noted above, wherein the percent volume can be correlated to the number of particles having a certain absorbance unit ("au").

In addition to their size, the surface coverage of the nanoprojections on the dielectric may also be selectively controlled to help achieve the desired electrical performance. That is, too small of a surface coverage may limit the ability to the conductive polymer layer to better adhere to the dielectric, but too large of a coverage may adversely impact the ESR of the capacitor. In this regard, the surface coverage of the nanoprojections is typically from about 0.1% to about 40%, in some embodiments from about 0.5% to about 30%, and in some embodiments, from about 1% to about 20%. The degree of surface coverage may be calculated in a variety of ways, such as by dividing the "actual capacitance" value by the "normal capacitance" value and then multiplying by 100. The "normal capacitance" is determined after forming the nanoprojections and then impregnating the anode with the conductive polymer solution, while the "actual capacitance" is determined after forming the nanoprojections, impregnating the anode with the conductive polymer solution, washing the conductive polymer solution from the interior of the anode, and then drying the anode to remove moisture.

A variety of different techniques may be employed to form the precoat layer of the present invention. As is known in the art, manganese oxides (e.g., manganese dioxide) are typically formed through pyrolytic decomposition of a precursor (e.g., manganese nitrate ($Mn(NO_3)_2$)), such as described in U.S. Pat. No. 4,945,452 to Sturmer, et al. For example, a dielectric-coated anode body may be contacted with a solution (e.g., dipped, immersed, sprayed, etc.) that contains the precursor and thereafter heated for conversion into the oxide. If desired, multiple application steps may be employed. The amount of time in which the anode body is in contact with a manganese oxide precursor solution may vary as desired. For example, the anode body may be dipped into such a solution for a period of time ranging from about 10 seconds to about 10 minutes.

The manganese oxide precursor solution may optionally contain a surfactant. Without intending to be limited by theory, it is believed that such a surfactant can reduce surface tension and thereby improve penetration of the solution into the interior of the anode body. Particularly suitable are nonionic surfactants, such as a polyglycol ether (e.g., polyoxyethylene alkyl ether), nonylphenoxypoly-(ethyleneoxy) ethanol (e.g., Igepal CO-630); isooctylphenoxy-polyethoxyethanol (e.g., Triton X-100), benzyletheroctylphenolethylene oxide condensate (e.g., Triton CF-10), 3,6-dimethyl-4-octyne-3,6-diol (e.g., Surfynol 82), and so forth. To achieve the desired improvement in the impregnation of the manganese oxide precursor without adversely impacting other characteristics of the capacitor, it is generally desired that the concentration of the surfactant is selectively controlled within a certain range. For example, the solution into which the anode body is dipped may contain the surfactant in an amount of from about 0.01 wt. % to about 30 wt. %, in some embodiments from about 0.05 wt. % to about 25 wt. %, and in some embodiments, from about 0.1 wt. % to about 20 wt. %. The precursor(s) (e.g., manganese nitrate) may likewise constitute from about 1 wt. % to about 55 wt. % in some embodiments from about 2 wt. % to about 15 wt. %, and in some embodiments, from about 5 wt. % to about 10 wt. %, of the solution. A carrier, such as water, may also be employed in the solution. Aqueous solutions of the present invention may, for instance, contain water in an amount of from about 30 wt. % to about 95 wt. %, in some embodiments from about 40 wt. % to about 99 wt. % and in some embodiments, from about 50 wt. % to about 95 wt. %. It should be understood that the actual amounts of the components in the solution may vary depending upon such factors as the particle size and distribution of particles in the anode, the temperature at which decomposition is performed, the identity of the dispersant, the identity of the carrier, etc.

If desired, the anode body may be contacted with a humidified atmosphere in a pretreatment step that occurs prior to contact with a manganese oxide precursor solution. Without intending to be limited by theory, the present inventors believe that the presence of a certain amount of water vapor can slow the thermal decomposition reaction of manganese dioxide, thereby causing it to form as dispersed nanoprojections. For example, during the pretreatment step, the anode body can be exposed to an atmosphere having a humidity level of from about 1 to about 30 grams of water per cubic meter of air ($g/m^3$), in some embodiments from about 4 to about 25 $g/m^3$, and in some embodiments, from about 5 to about 20 $g/m^3$. The relative humidity may likewise range from about 30% to about 90%, in some embodiments from about 40% to about 85%, and in some embodiments, from about 50% to about 80%. The temperature of the humidified atmosphere may vary, such as from about 10° C. to about 50° C., in some embodiments from about 15° C. to about 45° C., and in some embodiments, from about 20° C. to about 40° C. In addition to a pretreatment step, the anode body may also be contacted with a humidified atmosphere in an intermediate treatment step, which occurs after contact with a manganese oxide precursor solution. The humidified atmosphere in the intermediate treatment step may have the same or different conditions than that of the pretreatment step, but is generally within the ranges noted above.

Regardless, once contacted with the precursor solution for the desired amount of time, the part is heated to a temperature sufficient to pyrolytically convert the precursor (e.g., manganese nitrate) to an oxide. Heating may occur, for instance, in a furnace at a temperature of from about 150° C. to about 300° C., in some embodiments from about 180° C. to about 290° C., and in some embodiments, from about 190° C. to about 260° C. Heating may be conducted in a moist or dry atmosphere. In certain embodiments, for instance, heating may be conducted in a humidified atmosphere, which may be the same or different than the atmospheres used in the aforementioned pretreatment and intermediate treatment steps, but generally within the conditions noted above. The time for the conversion depends on the furnace temperature, heat transfer rate and atmosphere, but generally is from about 3 to about 5 minutes. After pyrolysis, the leakage current may sometimes be high due to damage suffered by the dielectric film during the deposition of the manganese dioxide. To reduce this leakage, the capacitor may be reformed in an anodization bath as is known in the art. For example, the capacitor may be dipped into an electrolyte such as described above and then subjected to a DC current.

If desired, the adhesive coating may also contain other layers to help reduce the likelihood of delamination. In one embodiment, for example, the adhesive coating may include a resinous layer, which may be continuous or discontinuous in nature. When employed, the particular arrangement of the resinous layer relative to the precoat layer may vary as desired. In one embodiment, for instance, the precoat layer may be initially formed on the dielectric, and the resinous layer may thereafter be applied to the coated dielectric. In such embodiments, the precoat layer overlies the dielectric and the resinous layer overlies the precoat layer and may contact the precoat layer and/or the dielectric. Despite the presence of the resinous layer, it is believed that the coated nanoprojections of the precoat layer are still capable of becoming embedded within the inner conductive polymer layer. In another embodiment, the resinous layer may be initially applied to the dielectric, and the precoat layer may thereafter be formed thereon. In such embodiments, the resinous layer overlies the dielectric and the precoat layer overlies the resinous layer.

The resinous layer may generally include a natural or synthetic resin, which may be a solid or semi-solid material that is polymeric in nature or capable of being polymerized, cured, or otherwise hardened. It is also typically desired that the resin is relatively insulative in nature. As used herein, the term "relatively insulative" generally means more resistive than the conductive polymer that primarily forms the inner conductive polymer layer. For example, in some embodiments, a relatively insulative resin can have a resistivity at 20° C. of about 1000 Ω-cm or more, in some embodiments about 10,000 Ω-cm or more, in some embodiments about $1\times10^5$ Ω-cm or more, and in some embodiments, about $1\times10^{10}$ Ω-cm or more. Some examples of suitable resins that may be employed include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. Shellac, which is believed to contain esters of various aliphatic and alicyclic hydroxy acids (e.g., aleuritic acid and shellolic acid), is particularly suitable. These and other resin materials are described in more detail in U.S. Pat. No. 6,674,635 to Fife, et al.

When employed, the esters of fatty acids, such as described above, may exist naturally or be refined from natural materials. For example, soybean oil is often obtained from soybeans through refinement by solvent extraction with petroleum hydrocarbons or using continuous screw press operations. Upon extraction, the obtained soybean oil is primarily constituted of triglycerides of oleic acid, linoleic acid, and linolenic acid. Tung oil, on the other hand, is a drying oil that often requires no such refinement. In some instances, it may be desired to initiate further esterification of a fatty acid mixture by reacting an alcohol therewith. Such fatty acid/alcohol ester derivatives may generally be obtained using any known alcohol capable of reacting with a fatty acid. For example, in some embodiments, monohydric and/or polyhydric alcohols with less than 8 carbon atoms, and in some embodiments, less than 5 carbon atoms, may be used in the present invention. Specific embodiments of the present invention include the use of methanol, ethanol, butanol, as well as various glycols, such as propylene glycol, hexylene glycol, etc. In one particular embodiment, shellac can be esterified by mixing it with an alcohol, such as described above. Specifically, shellac is a resinous excretion of an insect that is believed to contain a complex mixture of fatty acids that, to some extent, are esterified. Thus, when mixed with an alcohol, the fatty acid groups of the shellac are further esterified by reaction with the alcohol.

A resinous layer can be formed in a variety of different ways. For example, in one embodiment, the anode can be dipped into a solution of the desired resin(s). The solution can be formed by dissolving the selected protective resin into a solvent, such as water or a non-aqueous solvent. Some suitable non-aqueous solvents can include, but are not limited to, methanol, ethanol, butanol, as well as various glycols, such as propylene glycol, hexylene glycol, di(ethylene acetate) glycol, etc. Particularly desired non-aqueous solvents are those having a boiling point greater than about 80° C., in some embodiments greater than about 120° C., and in some embodiments, greater than about 150° C. As described above, the formation of a solution using a non-aqueous solvent may also lead to further esterification of fatty acids when such resinous materials are utilized. The anode can be dipped into the solution one or more times, depending on the desired thickness. For example, in some embodiments, multiple resinous layers may be employed, such as 2 to 10 layers, and in some embodiments, from 3 to 7 layers. Each layer may have a target thickness of, for instance, about 100 nanometers or less, in some embodiments about 30 nanometers or less, and in some embodiments, about 10 nanometers or less. Besides dipping, it should also be understood that other conventional application methods, such as sputtering, screen printing, electrophoretic coating, electron beam deposition, vacuum deposition, spraying, and the like, can also be used.

After forming the resinous layer, the anode part may be heated or otherwise cured. Heating can facilitate evaporation of any solvent used during application, and may also aid in the esterification and/or polymerization of the resinous materials. To facilitate esterification and/or polymerization, curing agents may also be added to the resinous layer. For instance, one example of a curing agent that can be used with shellac is sulfuric acid. The time and temperature at which heating occurs generally varies depending on the specific resinous materials utilized. Typically, each layer is dried at a temperature ranging from about 30° C. to about 300° C., and in some embodiments, from about 50° C. to about 150° C., for a time period ranging from about 1 minute to about 60 minutes, and in some embodiments, from about 15 minutes to about 30 minutes. It should also be understood that heating need not be utilized after application of each resinous layer.

IV. Solid Electrolyte

As noted above, the solid electrolyte of the capacitor includes an inner layer and outer layer formed from a conductive polymer. It should be understood that the term "outer" as used herein simply means that the layer overlies the inner layer. Additional polymer layers may also be disposed over an outer layer, as well as between an inner layer and an outer layer. Multiple inner and/or outer layers may also be employed.

Regardless, the conductive polymers used in the inner and outer layers are typically π-conjugated and have electrical conductivity after oxidation or reduction, such as an electrical conductivity of at least about 1 μS/cm. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. In one embodiment, for example, the polymer is a substituted polythiophene, such as those having the following general structure:

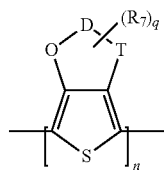

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

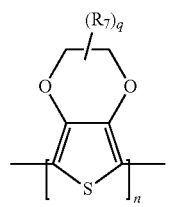

Methods for forming conductive polymers, such as described above, are well known in the art. For instance, U.S. Pat. No. 6,987,663 to Merker, et al., describes various techniques for forming substituted polythiophenes from a monomeric precursor. The monomeric precursor may, for instance, have the following structure:

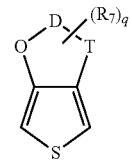

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

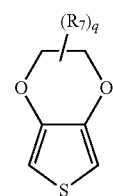

wherein, $R_7$ and q are as defined above. In one particular embodiment, "q" is 0. One commercially suitable example of 3,4-ethylenedioxthiophene is available from Heraeus Precious Metals GmbH & Co. KG under the designation Clevios™ M. Other suitable monomers are also described in U.S. Pat. No. 5,111,327 to Blohm, et al. and U.S. Pat. No. 6,635,729 to Groenendaal, et al. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

Notwithstanding its particular structure, the conductive polymer employed in at least one of the inner and outer layers is in the form of pre-polymerized particles. In one embodiment, for example, the inner layer is formed by in situ polymerization of a monomer, but the outer layer is formed from pre-polymerized particles. In yet other embodiments, both layers are formed from pre-polymerized particles. Various embodiments of such layers are described in more detail below.

A. Inner Layer

The inner polymer layer generally overlies and is in contact with the nanoprojections and dielectric, whether directly or via another layer (e.g., resinous layer). In one particular embodiment, the inner layer is formed by in situ polymerization. To form an in situ polymerized layer, the monomer may be chemically or electrochemically polymerized, optionally in the presence of a dopant to help increase conductivity.

In certain embodiments of the present invention, the monomer is polymerized in the presence of a dopant that also has an oxidative capability in that it includes a cation (e.g., transition metal) and an anion (e.g., sulfonic acid). For example, the dopant may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Precious Metals GmbH & Co. KG under the designation Clevios™ C.

Although dopants with an oxidative capacity can certainly be employed, the present inventors have discovered that they are not necessarily required. That is, due to its strong oxidation potential, the manganese oxide nanoprojections can serve as an oxidant. Thus, the inner layer may be generally free of conventional dopants or catalysts containing iron ions (e.g., $Fe^{2+}$ or $Fe^{3+}$), which can cause dielectric breakdown under high electric field due to ionic migration. In such embodiments, other types of dopants may still be employed, such as sulfonic acids. Suitable sulfonic acids may include, for instance, polymeric sulfonic acids (e.g., polystyrene sulfonic acid ("PSS"), polyvinyl sulfonic acid, etc.); $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric sulfonic acid (e.g., polystyrene sulfonic acid ("PSS")). The molecular weight of such polymeric anions typically ranges from about 1,000 to about 2,000,000, and in some embodiments, from about 2,000 to about 500,000.

Regardless of the reactants chosen, they may generally be applied either sequentially or together to initiate the polymerization reaction. Suitable application techniques for applying these components include screen-printing, dipping, electrophoretic coating, and spraying. As an example, the monomer may initially be mixed with a dopant, which may or may not have an oxidative capacity, to form a precursor solution. Once the mixture is formed, it may be applied to the anode part and then allowed to polymerize so that a conductive coating is formed on the surface. Alternatively, the dopant and monomer may be applied sequentially. In one embodiment, for example, the dopant is dissolved in an organic solvent (e.g., butanol) and then applied as a dipping solution. The anode part may then be dried to remove the solvent therefrom. Thereafter, the part may be dipped into a solution containing the monomer. Regardless, polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al.

Besides in situ polymerization, the inner layer may also be formed a plurality of pre-polymerized particles applied in the form of a dispersion. Again, one benefit of employing a dispersion is that it may minimize the presence of ionic species (e.g., $Fe^{2+}$ or $Fe^{3+}$) produced during conventional in situ polymerization processes. Thus, by applying the conductive polymer as a dispersion, the resulting capacitor may exhibit a relatively high "breakdown voltage." To enable good impregnation of the anode body, the particles employed in the dispersion typically have a small size, such as an average size (e.g., diameter) of from about 1 to about 150 nanometers, in some embodiments from about 2 to about 50 nanometers, and in some embodiments, from about 5 to about 40 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt % of the dispersion.

The dispersion also generally contains a counterion that enhances the stability of the particles. That is, the conductive polymer (e.g., polythiophene or derivative thereof) typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, sulfonic acids such as described above. When employed, the weight ratio of such counterions to conductive polymers in the dispersion and in the resulting layer is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization.

In addition to conductive polymer(s) and counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the formation of the solid electrolyte and the ability to apply it to the anode part. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-methacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The polymeric dispersion may be applied using a variety of known techniques, such as by spin coating, impregnation, pouring, dropwise application, injection, spraying, doctor blading, brushing, printing (e.g., ink-jet, screen, or pad printing), or dipping. Although it may vary depending on the application technique employed, the viscosity of the dispersion is typically from about 0.1 to about 100,000 mPas (measured at a shear rate of 100 $s^{-1}$), in some embodiments from about 1 to about 10,000 mPas, in some embodiments from about 10 to about 1,500 mPas, and in some embodiments, from about 100 to about 1000 mPas. Once applied, the layer may be dried and/or washed. One or more additional layers may also be formed in this manner to achieve the desired thickness. Typically, the total thickness of the layer(s) formed by this particle dispersion is from about 1 to about 50 μm, and in some embodiments, from about 5 to about 20 μm. The weight ratio of counterions to conductive polymers is likewise from about 0.5:1 to about 50:1, in some embodiments from about 1:1 to about 30:1, and in some embodiments, from about 2:1 to about 20:1.

In addition to a conductive polymer, the inner layer may optionally contain other components, such as a hydroxy-functional nonionic polymer. The term "hydroxy-functional" generally means that the compound contains at least one hydroxyl functional group or is capable of possessing such a functional group in the presence of a solvent. Without intending to be limited by theory, it is believed that hydroxy-functional nonionic polymers can improve the degree of contact between the polymer and the surface of the internal dielectric, which is typically relatively smooth in nature as a result of higher forming voltages. This unexpectedly increases the breakdown voltage and wet-to-dry capacitance of the resulting capacitor. Furthermore, it is believed that the use of a hydroxy-functional polymer with a certain molecular weight can also minimize the likelihood of chemical decomposition at high voltages. For instance, the molecular weight of the hydroxy-functional polymer may be from about 100 to 10,000 grams per mole, in some embodiments from about 200 to 2,000, in some embodiments from about 300 to about 1,200, and in some embodiments, from about 400 to about 800.

Any of a variety of hydroxy-functional nonionic polymers may generally be employed for this purpose. In one embodiment, for example, the hydroxy-functional polymer is a polyalkylene ether. Polyalkylene ethers may include polyalkylene glycols (e.g., polyethylene glycols, polypropylene glycols polytetramethylene glycols, polyepichlorohydrins, etc.), polyoxetanes, polyphenylene ethers, polyether ketones, and so forth. Polyalkylene ethers are typically predominantly linear, nonionic polymers with terminal hydroxy groups. Particularly suitable are polyethylene glycols, polypropylene glycols and polytetramethylene glycols (polytetrahydrofurans), which are produced by polyaddition of ethylene oxide, propylene oxide or tetrahydrofuran onto water. The polyalkylene ethers may be prepared by polycondensation reactions from diols or polyols. The diol component may be selected, in particular, from saturated or unsaturated, branched or unbranched, aliphatic dihydroxy compounds containing 5 to 36 carbon atoms or aromatic dihydroxy compounds, such as, for example, pentane-1,5-diol, hexane-1,6-diol, neopentyl glycol, bis-(hydroxymethyl)-cyclohexanes, bisphenol A, dimer diols, hydrogenated dimer diols or even mixtures of the dials mentioned. In addition, polyhydric alcohols may also be used in the polymerization reaction, including for example glycerol, di- and polyglycerol, trimethylolpropane, pentaerythritol or sorbitol.

In addition to those noted above, other hydroxy-functional nonionic polymers may also be employed in the present invention. Some examples of such polymers include, for instance, ethoxylated alkylphenols; ethoxylated or propoxylated $C_6$-$C_{24}$ fatty alcohols; polyoxyethylene glycol alkyl ethers having the general formula: $CH_3$—$(CH_2)_{10\text{-}16}$—$(O$—$C_2H_4)_{1\text{-}25}$—$OH$ (e.g., octaethylene glycol monododecyl ether and pentaethylene glycol monododecyl ether); polyoxypropylene glycol alkyl ethers having the general formula: $CH_3$—$(CH_2)_{10\text{-}16}$—$(O$—$C_3H_6)_{1\text{-}25}$—$OH$; polyoxyethylene glycol octylphenol ethers having the following general formula: $C_8H_{17}$—$(C_6H_4)$—$(O$—$C_2H_4)_{1\text{-}25}$—$OH$ (e.g., Triton™ X-100); polyoxyethylene glycol alkylphenol ethers having the following general formula: $C_9H_{19}$—$(C_6H_4)$—$(O$—$C_2H_4)_{1\text{-}25}$—$OH$ (e.g., nonoxynol-9); polyoxyethylene glycol esters of $C_8$-$C_{24}$ fatty acids, such as polyoxyethylene glycol sorbitan alkyl esters (e.g., polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, and PEG-20 castor oil, PEG-3 castor oil, PEG 600 dioleate, and PEG 400 dioleate) and polyoxyethylene glycerol alkyl esters (e.g., polyoxyethylene-23 glycerol laurate and polyoxyethylene-20 glycerol stearate); polyoxyethylene glycol ethers of $C_8$-$C_{24}$ fatty acids (e.g., polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, polyoxyethylene-20 isohexadecyl ether, polyoxyethylene-15 tridecyl ether, and polyoxyethylene-6 tridecyl ether); block copolymers of polyethylene glycol and polypropylene glycol (e.g., Poloxamers); and so forth, as well as mixtures thereof.

The hydroxy-functional nonionic polymer may be incorporated in a variety of different ways. In certain embodiments, for instance, the hydroxy-functional polymer may simply be incorporated into the inner layer, such as a dispersion described above. In such embodiments, the concentration of the hydroxy-functional polymer in the dispersion is typically from about 1 wt. % to about 50 wt. %, in some embodiments from about 5 wt. % to about 40 wt. %, and in some embodiments, from about 10 wt % to about 30 wt. %. In other embodiments, however, the hydroxy-functional polymer may be applied after the initial polymer dispersion is applied to the anode body. In such embodiments, the technique used to apply the hydroxy-functional polymer may vary. For example, the polymer may be applied in the form of a liquid solution using various methods, such as immersion, dipping, pouring, dripping, injection, spraying, spreading, painting or printing, for example, inkjet, screen printing or tampon printing. Solvents known to the person skilled in the art can be employed in the solution, such as water, alcohols, or a mixture thereof. The concentration of the hydroxy-functional polymer in such a solution typically ranges from about 5 wt. % to about 95 wt. %, in some embodiments from about 10 wt. % to about 70 wt. %, and in some embodiments, from about 15 wt. % to about 50 wt. % of the solution. If desired, such solutions may be generally free of conductive polymers. For example, conductive polymers may constitute about 2 wt. % or less, in some embodiments about 1 wt. % or less, and in some embodiments, about 0.5 wt. % or less of the solution.

B. Outer Layer

The outer polymer layer generally overlies the inner layer and may be formed by in situ polymerization, pre-polymerized particles, etc. In one particular embodiment, the outer layer is formed by a plurality of particles applied in the form of a dispersion, such as described above.

In certain embodiments, it may be desired to employ a hydroxy-functional polymer, such as described above, in the outer layer. For example, in certain embodiments, a polymer dispersion that contains conductive polymer particles and a hydroxy-functional polymer is applied to the anode body after the inner layer is formed on the anode body. The concentration of the hydroxy-functional polymer in the second polymer dispersion is typically from about 1 wt % to about 50 wt. %, in some embodiments from about 5 wt. % to about 40 wt. %, and in some embodiments, from about 10 wt. % to about 30 wt. %. Likewise, in those embodiments in which the hydroxy-functional polymer is employed in the outer layer, it may also be desirable that the inner layer is generally free of such hydroxy-functional nonionic polymers. For example, hydroxy-functional polymers may constitute about 2 wt. % or less, in some embodiments about 1 wt % or less, and in some embodiments, about 0.5 wt % or less of the inner layer. Once applied, the outer layer may be dried and/or washed. One or more additional layers may also be formed in this manner to achieve the desired thickness. Typically, the total thickness of the layers formed by the second polymer dispersion is from about 0.1 to about 5 μm, in some embodiments from about 0.1 to about 3 μm, and in some embodiments, from about 0.2 to about 1 μm.

V. External Polymer Coating

Although not required, an external polymer coating may also be applied to the anode body and overlie the solid electrolyte. The external polymer coating generally contains one or more layers formed from a dispersion of pre-polymerized conductive particles, such as described in more detail above. The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode body, the particles used in the external coating typically have a larger size than those employed in any optional dispersions of the solid electrolyte. For example, the ratio of the average size of the particles employed in the external polymer coating to the average size of the particles employed in any dispersion of the solid electrolyte is typically from about 1.5 to about 30, in some embodiments from about 2 to about 20, and in some embodiments, from about 5 to about 15. For example, the particles employed in the dispersion of the external coating may have an average size of from about 50 to about 500 nanometers, in some embodiments from about 80 to about 250 nanometers, and in some embodiments, from about 100 to about 200 nanometers.

If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No, 2007/0064376 to Merker, et al, and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl) cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent is typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 to about 50 μm, in some embodiments from about 2 to about 40 μm, and in some embodiments, from about 5 to about 20 μm.

VI. Other Layers

If desired, the capacitor may also contain other layers as is known in the art. For instance, the part may be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

VII. Terminations

The capacitor may also be provided with terminations, particularly when employed in surface mounting applications. For example, the capacitor may contain an anode termination to which the anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

Referring to FIG. 1, one embodiment of an electrolytic capacitor 30 is shown that includes an anode termination 62 and a cathode termination 72 in electrical connection with a capacitor element 33. The capacitor element 33 has an upper surface 37, lower surface 39, front surface 36, and rear surface 38. Although it may be in electrical contact with any of the surfaces of the capacitor element 33, the cathode termination 72 in the illustrated embodiment is in electrical contact with the lower surface 39 and rear surface 38. More specifically, the cathode termination 72 contains a first component 73 positioned substantially perpendicular to a second component 74. The first component 73 is in electrical contact and generally parallel with the lower surface 39 of the capacitor element 33. The second component 74 is in electrical contact and generally parallel to the rear surface 38 of the capacitor element 33. Although depicted as being integral, it should be understood that these portions may alternatively be separate pieces that are connected together, either directly or via an additional conductive element (e.g., metal). Also, in certain embodiments, it should be understood that the second component 74 may be eliminated from the cathode termination 72. The anode termination 62 likewise contains a first component 63 positioned substantially perpendicular to a second component 64. The first component 63 is in electrical contact and generally parallel with the lower surface 39 of the capacitor element 33. The second component 64 contains a region 51 that carries an anode lead 16. In the illustrated embodiment, the region 51 possesses a "U-shape" for further enhancing surface contact and mechanical stability of the lead 16.

The terminations may be connected to the capacitor element using any technique known in the art. In one embodiment, for example, a lead frame may be provided that defines the cathode termination 72 and anode termination 62. To attach the electrolytic capacitor element 33 to the lead frame, a conductive adhesive may initially be applied to a surface of the cathode termination 72. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Publication No. 2006/0038304 to Osako, et al. Any of a variety of techniques may be used to apply the conductive adhesive to the cathode termination 72. Printing techniques, for instance, may be employed due to their practical and cost-saving benefits.

A variety of methods may generally be employed to attach the terminations to the capacitor. In one embodiment, for example, the second component 64 of the anode termination 62 and the second component 74 of the cathode termination 72 are initially bent upward to the position shown in FIG. 1. Thereafter, the capacitor element 33 is positioned on the cathode termination 72 so that its lower surface 39 contacts the adhesive and the anode lead 16 is received by the upper U-shaped region 51. If desired, an insulating material (not shown), such as a plastic pad or tape, may be positioned between the lower surface 39 of the capacitor element 33 and the first component 63 of the anode termination 62 to electrically isolate the anode and cathode terminations.

The anode lead 16 is then electrically connected to the region 51 using any technique known in the art, such as mechanical welding, laser welding, conductive adhesives, etc. For example, the anode lead 16 may be welded to the anode termination 62 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode lead 16 to the anode termination 62, the conductive adhesive may then be cured. For example, a heat press may be used to apply heat and pressure to ensure that the electrolytic capacitor element 33 is adequately adhered to the cathode termination 72 by the adhesive.

Once the capacitor element is attached, the lead frame is enclosed within a resin casing, which may then be filled with silica or any other known encapsulating material. The width and length of the case may vary depending on the intended application. Suitable casings may include, for instance, "A", "B", "C", "D", "E", "F", "G", "H", "J", "K", "L", "M", "N", "P", "R", "S", "T", "V", "W", "Y", "X" or "Z" cases (AVX Corporation). Regardless of the case size employed, the capacitor element is encapsulated so that at least a portion of the anode and cathode terminations are exposed for mounting onto a circuit board. As shown in FIG. 1, for instance, the capacitor element 33 is encapsulated in a case 28 so that a portion of the anode termination 62 and a portion of the cathode termination 72 are exposed.

Regardless of the particular manner in which it is formed, the resulting capacitor may exhibit excellent electrical properties. The equivalent series resistance ("ESR") may, for instance, be about 1,200 milliohms or less, in some embodiments about 300 milliohms or less, in some embodiments about 200 milliohms or less, and in some embodiments, from about 1 to about 100 milliohms, as measured with a 2.2 volt DC bias and a 0.5 volt peak to peak sinusoidal signal, free of harmonics, at a frequency of 100 kHz. In addition, the leakage current, which generally refers to the current flowing from one conductor to an adjacent conductor through an insulator, can be maintained at relatively low levels. For example, the leakage current may be about 40 µA or less, in some embodiments about 25 µA or less, and in some embodiments, about 15 µA or less. The numerical value of the normalized leakage current of the capacitor may likewise be about 0.2 µA/µF*V or less, in some embodiments about 0.1 µA/µF*V or less, and in some embodiments, about 0.05 µA/µF*V or less, where µA is microamps and µF*V is the product of the capacitance and the rated voltage. The ESR and normalized leakage current values may even be maintained at relatively high temperatures. For example, the values may be maintained after reflow (e.g., for 10 seconds) at a temperature of from about 100° C. to about 350° C., and, in some embodiments from about 200° C. to about 300° C. (e.g., 240° C.).

The capacitor may also exhibit a relatively high "breakdown voltage" (voltage at which the capacitor fails), such as about 35 volts or more, in some embodiments about 50 volts or more, and in some embodiments about 60 volts or more. The capacitor can also exhibit a relatively high percentage of its wet capacitance, which enables it to have only a small capacitance loss and/or fluctuation in the presence of atmosphere humidity. This performance characteristic is quantified by the "wet-to-dry capacitance percentage", which is determined by the equation:

Wet-to-Dry Capacitance=(Dry Capacitance/Wet Capacitance)×100

The capacitor of the present invention, for instance, may exhibit a wet-to-dry capacitance percentage of about 50% or more, in some embodiments about 60% or more, in some embodiments about 70% or more, and in some embodiments, from about 80% to 100%.

The present invention may be better understood with reference to the following examples.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency may be 100 kHz and the temperature may be 23° C.±2° C.

Capacitance

The capacitance may be measured using a Keithley 3330 Precision LCZ meter with Kelvin Leads with 2.2 volt DC bias and a 0.5 volt peak to peak sinusoidal signal. The operating frequency may be 120 Hz and the temperature may be 23° C.±2° C.

EXAMPLE 1

18,000 µFV/g tantalum powder was used to form anode samples. Each anode sample was embedded with a tantalum wire, sintered at 1800° C., and pressed to a density of 5.6 g/cm³. The resulting pellets had a size of 3.75×3.70×2.00 mm. The pellets were anodized to 315V in water/phosphoric acid electrolyte with conductivity 8.6 mS at temperature of 85° C. to form the dielectric layer. To form the precoat layer, the anode part was placed in a humidified atmosphere (30° C., humidity of 8 g/m³) for 30 minutes and then dipped for 3 minutes in a solution containing manganese nitrate (specific gravity of 1.09) and 1 wt. % of a polyalkyl ether surfactant. The part was placed in another humidified atmosphere (30° C., humidity of 8 g/m³) for 120 minutes, and thereafter heat-treated at 250° C. in an atmosphere having 80% relative humidity. It was determined that the resulting manganese dioxide nanoprojections had an average size of about 10 nanometers, and the surface coverage was about 10%.

To form the inner conductive polymer layer, the anode part was initially dipped for 30 seconds into a solution containing 1 part of 3,4-ethylenedioxythiophene monomer, 6.4 parts of an oxidizer (50 wt. % iron p-toluenesulfonate), 6 parts of butanol, and 1 part water. The monomer was allowed to polymerize for 60 minutes at 20° C. in an atmosphere containing 80% relative humidity, and then washed in a solution containing water, butanol, and p-toluenesulfonate (2 wt. %). Thereafter, the parts were dipped into a dispersed poly(3,4-ethylenedioxythiophene) having a solids content 2% and viscosity 20 mPa·s (Clevios™ K, H. C. Starck). Upon coating, the parts were dried at 125° C. for 20 minutes. The parts were then dipped into a dispersed poly(3,4-ethylenedioxythiophene) having a solids content 2% and viscosity 160 mPa·s (Clevios™ K, H. C. Starck). Upon coating, the parts were dried at 125° C. for 20 minutes. This process was repeated 8 times. The part was then dipped into a graphite dispersion and dried, and dipped into a silver dispersion and dried. The finished parts were completed by conventional assembly technology. 100 parts of 3.3 μF/125V capacitors were made in this manner. After testing, it was determined that the capacitance was 3.39 μF and ESR was 92 mΩ.

COMPARATIVE EXAMPLE 1

Capacitors were formed in the manner described in Example 1, except that the precoat layer was not employed. 100 parts of 3.3 μF/125V capacitors were made in this manner. After testing, it was determined that the capacitance was 3.44 μF and ESR was 133 ma

EXAMPLE 2

18,000 μFV/g tantalum powder was used to form anode samples. Each anode sample was embedded with a tantalum wire, sintered at 1800° C., and pressed to a density of 5.6 g/cm³. The resulting pellets had a size of 3.75×3.70×2.00 mm. The pellets were anodized to 315V in water/phosphoric acid electrolyte with conductivity 8.6 mS at temperature of 85° C. to form the dielectric layer. To form a precoat layer, the anode part was placed in a humidified atmosphere (30° C., humidity of 8 g/m³) for 30 minutes and then dipped for 3 minutes in a solution containing manganese nitrate (specific gravity of 1.09) and 1 wt. % of a polyalkyl ether surfactant. The part was placed in another humidified atmosphere (30° C., humidity of 8 g/m³) for 120 minutes, and thereafter heat-treated at 250° C. in an atmosphere having 80% relative humidity.

To form the inner conductive polymer layer, the resulting part was then dipped in solution containing 14 parts of 3,4-ethylenedioxthiophene monomer, 86 parts of butanol, 0.01 part of polystyrene sulfonic acid and 0.5 parts of water (wt %). The monomer was allowed to polymerize for 60 minutes at 20° C. in-situ and then washed in butanol. A conductive polymer coating was then formed by dipping the anodes into a dispersed poly(3,4-ethylenedioxythiophene) having a solids content 1.1% and viscosity 20 mPa·s (Clevios™ K, H. C. Starck). Upon coating, the parts were dried at 125° C. for 20 minutes. This process was repeated 10 times. Thereafter, the parts were dipped into a dispersed poly(3,4-ethylenedioxythiophene) having a solids content 2% and viscosity 20 mPa·s (Clevios™ K, H. C. Starck). Upon coating, the parts were dried at 125° C. for 20 minutes. This process was not repeated. Thereafter, the parts were dipped into a dispersed poly(3,4-ethylenedioxythiophene) having a solids content 2% and viscosity 160 mPa·s (Clevios™ K, H. C. Starck). Upon coating, the parts were dried at 125° C. for 20 minutes. This process was repeated 8 times. The parts were then dipped into a graphite dispersion and dried. Finally, the parts were dipped into a silver dispersion and dried. 100 parts of 3.3 μF/125V capacitors were made in this manner. After testing, it was determined that the capacitance was 2.23 μF and ESR was 1013 mΩ.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising:
   an anode body;
   a dielectric that overlies the anode body;
   an adhesion coating that overlies the dielectric, wherein the adhesion coating contains a discontinuous precoat layer that contains a plurality of discrete nanoprojections of a manganese dioxide;
   a solid electrolyte that overlies the adhesive coating and includes an inner conductive polymer layer and an outer conductive polymer layer, at least one of which is formed from a dispersion of pre-polymerized particles; and
   an external polymer coating overlying the solid electrolyte, wherein the external polymer coating contains a plurality of pre-polymerized conductive polymer particles, and wherein a ratio of an average size of the pre-polymerized conductive polymer particles, particles employed in the external polymer coating to an average size of the particles employed in any dispersion of the solid electrolyte is from about 1.5 to about 30,
   wherein one or more discrete manganese dioxide nanoprojections are embedded in the solid electrolyte; and
   wherein the manganese dioxide nanoprojections have an average size of from about 5 nanometers to about 500 nanometers.

2. The solid electrolytic capacitor of claim 1, wherein the inner conductive polymer layer is in contact with the dielectric and the nanoprojections.

3. The solid electrolytic capacitor of claim 1, wherein the inner conductive polymer layer is formed by in situ polymerization.

4. The solid electrolytic capacitor of claim 3, wherein in situ polymerization is performed in the presence of a dopant.

5. The solid electrolytic capacitor of claim 4, wherein the dopant is free of iron ions.

6. The solid electrolytic capacitor of claim 1, wherein the outer layer is formed from the dispersion of pre-polymerized particles.

7. The solid electrolytic capacitor of claim 6, wherein the outer layer includes a hydroxyl-functional non-ionic polymer.

8. The solid electrolytic capacitor of claim 1, wherein the inner conductive polymer layer, outer conductive polymer layer, or both include a substituted polythiophene.

9. The solid electrolytic capacitor of claim 8, wherein the substituted polythiophene is poly(3,4-ethylenedioxythiophene).

10. The solid electrolytic capacitor of claim 1, wherein the electrically conductive powder includes tantalum and the dielectric includes tantalum pentoxide.

11. The solid electrolytic capacitor of claim 1, wherein about 50% or more of the nanoprojections have an average size of from about 10 nanometers to about 110 nanometers.

12. The solid electrolytic capacitor of claim 1, wherein the surface coverage of the nanoprojections is from about 0.1% to about 40%.

13. The solid electrolytic capacitor of claim 1, wherein the adhesive coating further comprises a resinous layer that includes a resin formed from shellac.

14. A method for forming a solid electrolytic capacitor, the method comprising:
   contacting an anode that contains an anode body and a dielectric with a solution that contains a manganese oxide precursor;
   pyrolytically converting the precursor to form a discontinuous pre-coat layer containing a plurality of discrete nanoprojections of a manganese dioxide;
   chemically polymerizing a monomer to form an inner conductive polymer layer of a solid electrolyte that is in contact with the dielectric and nanoprojections;
   applying a dispersion of pre-polymerized conductive polymer particles to form an outer layer of the solid electrolyte that overlies the inner layer, wherein at least one of the inner conductive polymer layer or the outer layer is formed from a dispersion of pre-polymerized particles; and
   applying an external polymer coating overlying the solid electrolyte, wherein the external polymer coating contains a plurality of pre-polymerized conductive polymer particles, and wherein a ratio of an average size of the pre-polymerized conductive polymer particles employed in the external polymer coating to an average size of the particles employed in any dispersion of the solid electrolyte is from about 1.5 to about 30;
   wherein one or more discrete manganese dioxide nanoprojections are embedded in the solid electrolyte; and
   wherein the manganese dioxide nanoprojections have an average size of from about 5 nanometers to about 500 nanometers.

15. The method of claim 14, wherein the manganese oxide precursor is manganese nitrate.

16. The method of claim 14, wherein the solution contains a surfactant in an amount of from about 0.01 wt. % to about 30 wt. %.

17. The method of claim 14, further comprising contacting the anode with a humidified atmosphere prior to contact with the solution containing the manganese oxide precursor, wherein the humidified atmosphere has a humidity level of from about 1 to about 30 $g/m^3$, a relative humidity of from about 30% to about 90%, or both.

18. The method of claim 14, further comprising contacting the anode with a humidified atmosphere after contact with the solution containing the manganese oxide precursor but prior to pyrolytically converting the precursor, wherein the humidified atmosphere has a humidity level of from about 1 to about 30 $g/m^3$, a relative humidity of from about 30% to about 90%, or both.

19. The method of claim 14, wherein the precursor is pyrolytically converted in the presence of a humidified atmosphere, wherein the humidified atmosphere has a humidity level of from about 1 to about 30 $g/m^3$, a relative humidity of from about 30% to about 90%, or both.

20. The method of claim 14, wherein the monomer is 3,4-ethylenedioxythiophene.

* * * * *